United States Patent
Manepalli et al.

(10) Patent No.: US 10,142,871 B1
(45) Date of Patent: Nov. 27, 2018

(54) DEVICE, SYSTEM, AND METHOD FOR OPTIMIZATIONS TO CAMP ONLY MODE

(71) Applicant: APPLE INC., Cupertino, CA (US)

(72) Inventors: Venkateswara Rao Manepalli, San Jose, CA (US); Jianxiong Shi, Dublin, CA (US); Madhusudan Chaudhary, Campbell, CA (US); Srinivasan Nimmala, San Jose, CA (US); Murtaza A. Shikari, Mountain View, CA (US); Srirang A. Lovlekar, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 15/595,412

(22) Filed: May 15, 2017

(51) Int. Cl.
| | |
|---|---|
| H04W 24/08 | (2009.01) |
| H04W 4/38 | (2018.01) |
| H04W 76/16 | (2018.01) |
| G08B 7/06 | (2006.01) |
| G08B 29/02 | (2006.01) |
| H04B 17/23 | (2015.01) |

(52) U.S. Cl.
CPC .......... *H04W 24/08* (2013.01); *H04W 76/16* (2018.02); *G08B 7/06* (2013.01); *G08B 29/02* (2013.01); *H04B 17/23* (2015.01); *H04W 4/38* (2018.02)

(58) Field of Classification Search
CPC ... H04W 24/08; H04W 76/16; H04W 76/026; H04W 4/38; H04W 4/006; H04B 17/23; G08B 7/06; G08B 29/02
See application file for complete search history.

(56) References Cited

U.S. PATENT DOCUMENTS

| | | | |
|---|---|---|---|
| 9,578,473 B1* | 2/2017 | Ponukumati | H04W 4/12 |
| 2013/0083753 A1* | 4/2013 | Lee | H04W 72/0453 |
| | | | 370/329 |
| 2015/0092630 A1* | 4/2015 | Lin | H04L 5/14 |
| | | | 370/280 |
| 2016/0044578 A1* | 2/2016 | Vajapeyam | H04W 52/0216 |
| | | | 370/252 |
| 2017/0006604 A1* | 1/2017 | Challa | H04W 4/90 |
| 2017/0105166 A1* | 4/2017 | Lee | H04W 48/12 |
| 2017/0134123 A1* | 5/2017 | Ozturk | H04L 1/1628 |
| 2017/0280473 A1* | 9/2017 | Krishnamoorthy | |
| | | | H04W 72/1231 |

* cited by examiner

*Primary Examiner* — Ajit Patel
(74) *Attorney, Agent, or Firm* — Fay Kaplun & Marcin, LLP

(57) ABSTRACT

A device, system, and method uses a camp only mode based on a connectivity status. The method is performed at a device that is configured to establish a first connection to a first network and configured to establish a second connection to a second network. The method includes determining the connectivity status of the device. When the connectivity status indicates that the device has established the first connection, the method includes utilizing a camp-only mode to monitor the second network, the camp-only mode reducing a frequency of at least one type of operation associated with the second network, the camp-only mode configured to retain a capability of determining whether an emergency message is being broadcast over the second network.

19 Claims, 4 Drawing Sheets

US 10,142,871 B1

DEVICE, SYSTEM, AND METHOD FOR OPTIMIZATIONS TO CAMP ONLY MODE

BACKGROUND INFORMATION

A user equipment (UE) may be configured to establish a connection to at least one of a plurality of different networks or types of networks as well as with other UEs to perform a variety of different functionalities via the connection. For example, the UE may connect to a first type of network (e.g., Long Term Evolution (LTE) network) to communicate with another UE through the network connection (e.g., a user of the UE may perform a voice call or transmit a text to another user of another UE). In another example, the UE may connect to a second type of network (e.g., WiFi network) to receive browser data at a higher rate of data exchange. In a further example, the UE may directly connect to a further UE using a short-range communication protocol (e.g., BlueTooth).

Despite the various ways that the UEs may connect to networks or with other UEs, the functionality of receiving commercial mobile alert system (CMAS) messages remaining active is a regulatory requirement for any UE that is capable of connecting to a cellular network over which CMAS messages are broadcast (e.g., Global System for Mobile Communications (GSM), Code Division Multiple Access (CDMA), Wideband CDMA (WCDMA), LTE, etc.). Since the CMAS messages are only broadcast over a cellular network, the UE must remain connected, in some manner, to the cellular network, even when the UE has established a connection to a non-cellular network (e.g., WiFi network). However, leaving the baseband activated for this purpose is a drain on a limited power supply.

SUMMARY

The exemplary embodiments are directed to a method, comprising: at a device that is configured to establish a first connection to a first network and configured to establish a second connection to a second network: determining a connectivity status of the device; and when the connectivity status indicates that the device has established the first connection, utilizing a camp-only mode to monitor the second network, the camp-only mode reducing a frequency of at least one type of operation associated with the second network, the camp-only mode configured to retain a capability of determining whether an emergency message is being broadcast over the second network.

The exemplary embodiments are directed to a device, comprising: a transceiver configured to establish a first connection to a first network and configured to establish a second connection to a second network; and a processor determining a connectivity status of the device, when the connectivity status indicates that the device has established the first connection, the processor utilizing a camp-only mode to monitor the second network, the camp-only mode reducing a frequency of at least one type of operation associated with the second network, the camp-only mode configured to retain a capability of determining whether an emergency message is being broadcast over the second network.

The exemplary embodiments are directed to an integrated circuit, comprising: circuitry to determine a connectivity status of a device configured to establish a first connection to a first network and configured to establish a second connection to second network; and when the connectivity status indicates that the device has established the first connection, circuitry to utilize a camp-only mode to monitor the second network, the camp-only mode reducing a frequency of at least one type of operation associated with the second network, the camp-only mode configured to retain a capability of determining whether an emergency message is being broadcast over the second network.

DETAILED DESCRIPTION

Figure 1:
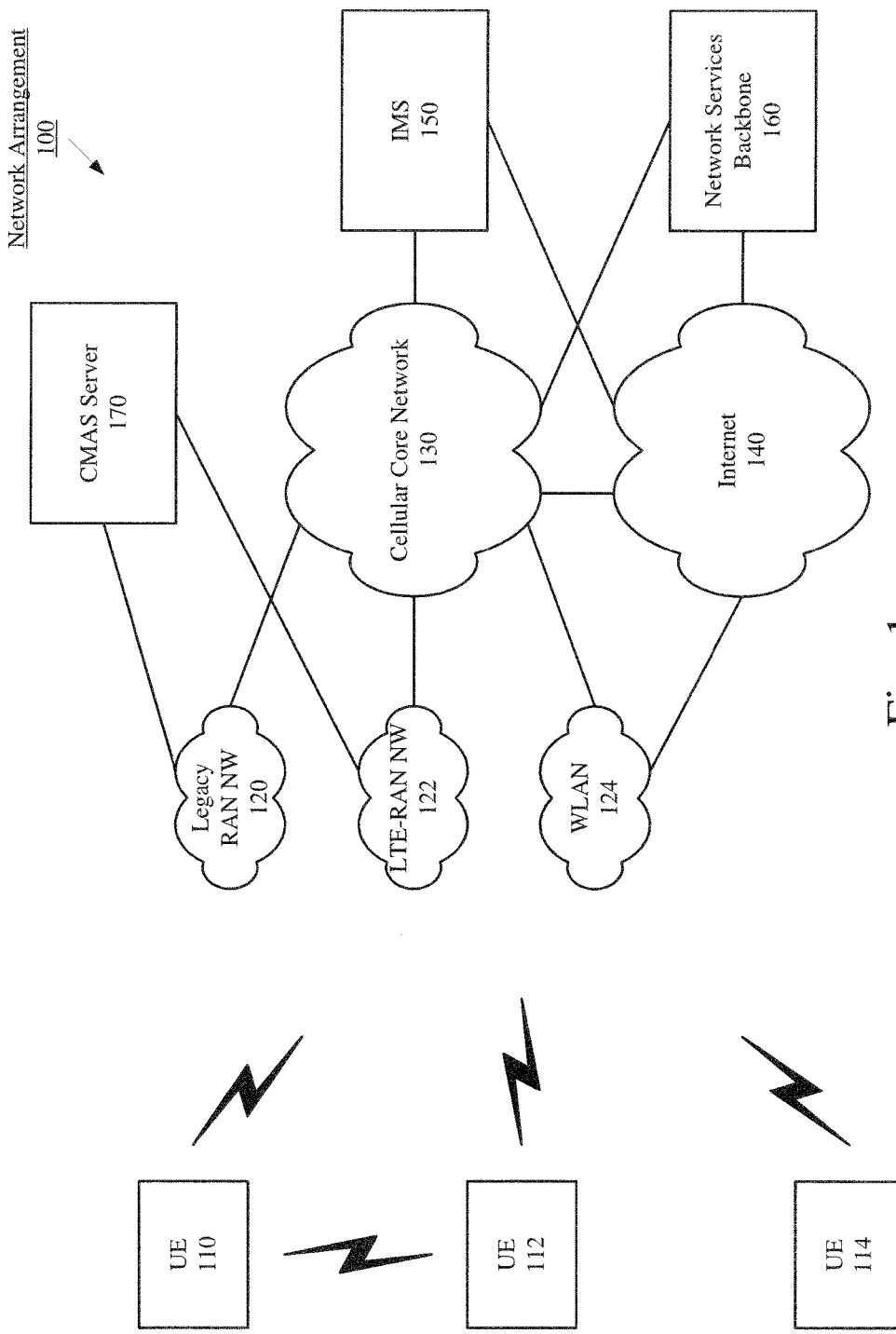
FIG. 1 shows a network arrangement according to the various exemplary embodiments described herein.

The exemplary embodiments may be further understood with reference to the following description and the related appended drawings, wherein like elements are provided with the same reference numerals. The exemplary embodiments are related to a device, system, and method for utilizing a camp-only mode on a user equipment (UE). Specifically, the (UE) may be connected to a first network (e.g., a WiFi network) but required to monitor a second network (e.g., a Long Term Evolution (LTE) network). However, the exemplary embodiments provide for the monitoring of the second network in a manner that utilizes limited power, thereby saving the power supply of the UE. Accordingly, the exemplary embodiments provide a first mechanism in which the monitoring of the second network is modified using the camp-only mode and a second mechanism to process data from the monitoring of the second network using the camp-only mode.

Initially, it is noted that the exemplary embodiments are described with regard to a UE. However, the UE is only exemplary. The exemplary embodiments may be utilized with any device that may establish a connection with a plurality of different types of networks and configured with the hardware, software, and/or firmware to exchange and process data with these different types of networks. Therefore, the UE as described herein is used to represent any device.

It is also noted that the exemplary embodiments are described with regard to the UE having a companion UE where the UE is a slave and the companion UE is a master. Accordingly, when the UE and the companion UE are connected to one another over a short-range communication pathway, the UE may receive data via the companion UE. When the UE and the companion are not connected, the UE may receive data over the networks directly (instead of through the companion UE). However, the use of the UE and the companion UE is only exemplary. The exemplary embodiments may be utilized for any UE (with or without a companion UE) and represent any device.

With developments to UEs as well as further types of UEs being introduced (e.g., with the Internet of Things (IoT)), the manner in which the UEs may communicate with networks or other UEs has expanded. For example, a first UE may be linked to a second UE as companions. Specifically, the first UE may be a wearable (e.g., a slave) while the second UE may be a smartphone which is the wearable's companion (e.g., master). While the wearable and the smartphone are within range of one another within the limits of a short-range communication protocol, the wearable and the smartphone may communicate such that data being received by the smartphone may be relayed to the wearable (e.g., an incoming call or text received on the smartphone may be relayed to the wearable). In this manner, the wearable may conserve a limited power supply by using only the short-range communication protocol instead of having to associate with and monitor one or more networks.

The UE (e.g., the wearable) may also be configured to associate and exchange data with one or more networks independently without the companion UE. For example, when the UE is separated from the companion UE (e.g., greater than the distance of the short-range communication protocol), the UE may include the hardware, software, and firmware required to connect to one or more networks such as a WiFi network and a cellular network. However, as noted above, the UE may have a limited power supply (e.g., even more limited than the companion UE) and connecting with networks may drain more power than only using the short-range communication protocol.

In the scenario where the UE is not connected to the companion, connected to a WiFi network (e.g., supporting WiFi voice calls), and configured to connect to a cellular network, regulatory requirements require that the UE is to maintain some form of connection to the cellular network to receive emergency messages such as Commercial Mobile Alert System (CMAS) messages, Earthquake and Tsunami Warning Service (ETWS) messages, etc. Thus, even though the UE may be capable of receiving data via the WiFi network, since the emergency messages may only be transmitted via the cellular network, the UE must monitor the cellular network. It is noted that the requirement of receiving emergency messages applies whether or not the cellular network supports a WiFi calling functionality. Again, this additional load of network operations requires further power from the UE (on top of monitoring the short-range communication pathway for the companion and connecting to the WiFi network for data exchange). Thus, leaving the cellular baseband activated for this purpose is an additional drain on a limited power supply, especially when the UE is a wearable with a very limited power supply compared to other portable UEs.

In view of this regulatory requirement and to lighten the power requirements in satisfying this requirement, the exemplary embodiments provide a camp-only mode for the UE when the UE is not connected to its companion UE, is connected to a WiFi network, and is capable of receiving emergency messages from a cellular network. The camp-only mode is directed to the monitoring of the cellular network to listen for an emergency message or an indications of the emergency message. According to a first mechanism, the UE may monitor the cellular network with various settings in place that reduce the amount of power associated with monitoring the cellular network. According to a second mechanism to compensate for these settings in the camp-only mode, the UE may still monitor and process emergency messages broadcast in the cellular network, thereby satisfying the regulatory requirement.

It is noted that the features of the exemplary embodiments are described with regard to the UE being connected to a WiFi network and monitoring a cellular network. However, it should be noted that the use of the WiFi network and the cellular network is only exemplary. The exemplary embodiments may be used with any scenario in which the UE is connected to a first network to exchange data and monitoring a second network where the UE is capable of receiving a select type of data over the second network but not the first network. In addition, while the exemplary embodiments can be described with reference to a wearable UE, it should be understood that the functionalities described herein may be implemented by any UE.

FIG. 1 shows a network arrangement 100 according to the exemplary embodiments. The network arrangement 100 includes UEs 110-114. Those skilled in the art will understand that the UEs 110-114 may be any type of electronic component that is configured to communicate via a network, e.g., mobile phones, tablet computers, desktop computers, smartphones, phablets, embedded devices, wearables, Cat-M devices, Cat-M1 devices, MTC devices, eMTC devices, etc. It should also be understood that an actual network arrangement may include any number of UEs being used by any number of users and being associated with any number of these users where the user may be associated with one or more of the UEs. That is, the example of three (3) UEs 110-114 is only provided for illustrative purposes.

Each of the UEs 110-114 may be configured to communicate directly with one or more networks. In this example, the networks with which the UEs 110-114 may wirelessly communicate are a legacy radio access network (RAN) 120 (e.g., a first type of cellular network), a LTE RAN (LTE-RAN) 122 (e.g., a second type of cellular network), and a wireless local area network (WLAN) 124 (e.g., a WiFi network). However, it should be understood that the UEs 110-114 may also communicate with other types of networks and may also communicate using a wired connection. With regards to the exemplary embodiments, the UEs 110-114 may establish a connection with one or more of the legacy RAN 120, the LTE-RAN 122, and the WLAN 124. For example, the UEs 110-114 may have a legacy chipset, a LTE chipset, and/or a WiFi chipset that are used to communicate with the legacy RAN 120, the LTE-RAN 122, and/or the WLAN 124, respectively. The use of three (3) networks is only exemplary and there may be any other number of networks with which the UEs 110-114 may communicate.

Each of the UEs 110-114 may also be configured to communicate with the other UEs 110-114 without using the networks 120-124. For example, as illustrated, the UE 110 may communicate with the UE 112 using a short-range communication protocol such as BlueTooth. Thus, if the UE 110 and the UE 112 are within a proximity of one another (e.g., within a distance in which BlueTooth communications may be performed), the UE 110 and the UE 112 may exchange data. In a specific exemplary embodiment, if the short-range communication protocol is being used, the UE 110 and the UE 112 may have a companion relationship where the UE 110 is a slave and the UE 112 is a master. Thus, the UE 110 may utilize only the short-range communication protocol without connecting to any of the networks 120-124 while the UE 112 may connect to one or more of the networks 120-124 and relay data exchanged between the networks 120-124 and the UE 112 to the UE 110 over the short-range communication pathway. However, it is again noted that the use of a companion relationship is only exemplary and the UE 110 may connect to one or more of the networks 120-124 whether or not the UE 110 is within range of communicating with the UE 112 over the short-range communication pathway.

The legacy RAN 120 and the LTE-RAN 122 are portions of cellular networks that may be deployed by cellular providers (e.g., Verizon, AT&T, Sprint, T-Mobile, etc.). These networks 120 and 122 may include, for example, base client stations (Node Bs, eNodeBs, HeNBs, etc.) that are configured to send and receive traffic from UEs that are equipped with the appropriate cellular chip set. As noted above, the exemplary embodiments are described with regard to the LTE-RAN 122 but, as will be described in detail below, may be modified for use with the legacy RAN 120 when emergency messages are broadcast using the legacy RAN 120 (e.g., Wideband Code Division Multiple Access (WCDMA)). The WLAN 124 may include any type of wireless local area network (WiFi, Hot Spot, IEEE 802.11x networks, etc.).

In addition to the networks 120-124, the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. The cellular core network 130 also manages the traffic that flows between the cellular network and the Internet 140. The IMS 150 may be generally described as an architecture for delivering multimedia services to the UEs 110-114 using the IP protocol. The IMS 150 may communicate with the cellular core network 130 and the Internet 140 to provide the multimedia services to the UEs 110-114. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UEs 110-114 in communication with the various networks. The network services backbone 160 may interact with the UEs 110-114 and/or the networks 120, 122, 124, 130, 140 to provide these extended functionalities.

The network arrangement 100 may further include a CMAS server 170. The CMAS server 170 may generate emergency messages and/or emergency message indications (e.g., pings) to be broadcast over the cellular networks 120, 122 to the UEs 110-114. The CMAS server 170 may generate specifically formatted messages as defined by a regulatory agency in a region where the CMAS server 170 is utilized (e.g., North America). As noted above, the CMAS server 170 may broadcast the emergency messages only over the cellular networks 120, 122 (and not the WLAN 124). It is noted that the CMAS server 170 being oriented around the CMAS is only exemplary. The CMAS server 170 may represent any entity and network component(s) configured to broadcast emergency messages or emergency message indications to the UEs 110-114. For example, the CMAS server 170 may represent a ETWS server for another region utilizing the ETWS protocol (e.g., Asia).

Figure 2:
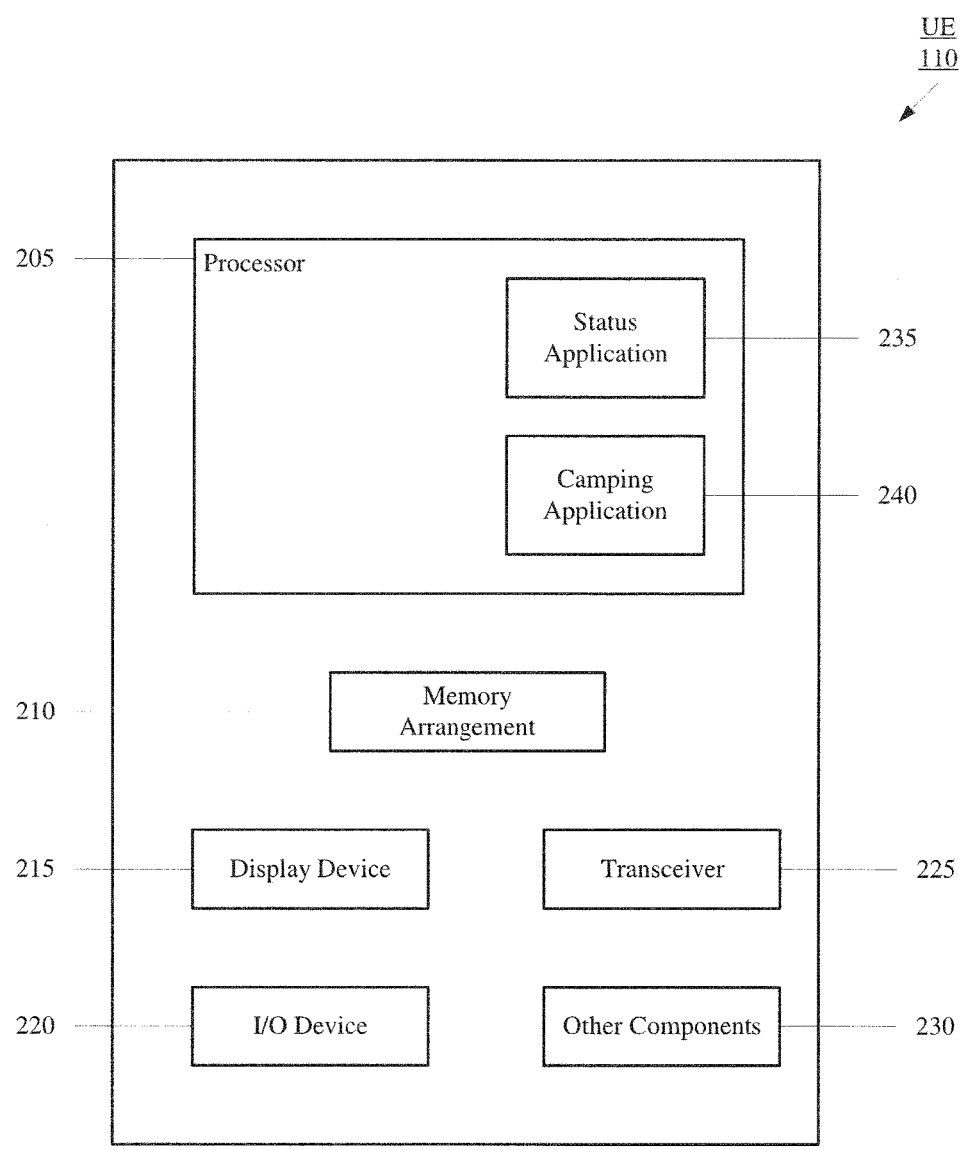
FIG. 2 shows a user equipment according to the various exemplary embodiments described herein.

The exemplary embodiments relate to the UE 110 connecting to a WiFi network (e.g., through the WLAN 124) and monitoring the LTE-RAN 122 while separated from the UE 112 which is a companion master to the UE 110. FIG. 2 shows the UE 110 of the network arrangement 100 of FIG. 1 according to the exemplary embodiments. Specifically, the UE 110 is configured to execute a plurality of applications that perform functionalities to utilize a camp-only mode. In one example, the camp-only mode is utilized when the UE 110 is (1) separated from the UE 112, (2) connected to the WiFi network (e.g., WLAN 124), and (3) capable of connecting to the LTE-RAN 122. However, it is again noted that the UE 110 being a companion with the UE 112 is only exemplary and not a requirement of the exemplary embodiments. It is also noted that the UE 110 being configured with the features of the exemplary embodiments is only exemplary. That is, the UE 110 may also represent the UEs 112, 114.

The UE 110 may represent any electronic device that is configured to perform wireless functionalities and may be representative of one or more of the UEs 110-114 (examples of which are noted above). The UE 110 may include a processor 205, a memory arrangement 210, a display device 215, an input/output (I/O) device 220, a transceiver 225, and other components 230. The other components 230 may include, for example, an audio input device, an audio output device, a battery that provides a limited power supply, a data acquisition device, ports to electrically connect the UE 110 to other electronic devices, etc.

The processor 205 may be configured to execute a plurality of applications of the UE 110. For example, the applications may include a status application 235 and a camping application 240. The status application 235 may be configured to determine the connectivity conditions of the UE 110. Accordingly, when the connectivity conditions indicate using the camp-only mode, the status application 235 may generate a signal indicating that the proper conditions exist for the camp-only mode to the camping application 240. The camping application 240 may be configured to generate instructions for a baseband or network components of the UE 110 to modify the manner in which operations are performed over the cellular network 120, 122 under the camp-only mode. For illustrative purposes, the LTE-RAN 122 will be used to represent the cellular networks 120, 122. However, the exemplary embodiments described below will also describe how the exemplary embodiments may be utilized with the legacy RAN 120. The camping application 240 may also be configured to perform operations when an emergency message is determined to be broadcast by the cellular network 120, 122.

It should be noted that the above noted applications each being an application (e.g., a program) executed by the processor 205 is only exemplary. The functionality associated with the applications may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. In addition, in some UEs, the functionality described for the processor 205 is split among two processors, a baseband processor and an applications processor. The exemplary embodiments may be implemented in any of these or other configurations of a UE. For illustrative purposes, the processor 205 may be a baseband processor.

The memory 210 may be a hardware component configured to store data related to operations performed by the UE 110. As will be described in further detail below, the memory 210 may store data received from network components or other UEs (e.g., the companion UE 112) for the status application 235 to perform its functionality. The display device 215 may be a hardware component configured to show data to a user while the I/O device 220 may be a hardware component that enables the user to enter inputs. It should be noted that the display device 215 and the I/O device 220 may be separate components or integrated together such as a touchscreen.

The transceiver 225 may be a hardware component configured to exchange data with a base station associated with the legacy RAN 120, a base station of the LTE-RAN 122 (e.g., an evolved Node B (eNB)), a router of a WLAN 124, the UE 112, etc. Accordingly, the transceiver 225 may operate on a variety of different frequencies or channels (e.g., set of consecutive frequencies). Therefore, the transceiver 225 may include one or more components to enable the data exchange with the various networks and UEs. For example, a first component of the transceiver 225 may enable a BlueTooth connection to be established with the UE 112, a second component of the transceiver 225 may enable a LTE connection to be established with the LTE-RAN 122, and a third component of the transceiver 225 may enable a WiFi connection to be established with the WLAN 124. One or more antennas (not shown) may be coupled to these one or more components of the transceiver 225 to enable the transceiver 225 to operate on the various frequency bands.

As described above, the status application 235 may be configured to determine the connectivity conditions of the UE 110. Through the capability of the transceiver 225 to receive signals and responses from network components of the various networks and from the UE 112, the status application 235 may determine whether a connection with the UE 112 has been established, a connection with the LTE-RAN 122 has been established or is capable of being established, and/or a connection with the WLAN 124 has been established. By determining which combination of connections are established or being used, the status application 235 may determine how data and/or emergency messages are to be received by the UE 110.

In a first manner of receiving emergency messages, the UE 110 may utilize the companion UE 112. Specifically, as the companion UE 112 may be a smartphone or other device that has a greater power supply or better data exchange performance than the UE 110, the UE 110 may utilize the transceiver 225 to establish a short-range communication pathway (e.g., over BlueTooth) to conserve power on the UE 110. In using the short-range communication pathway, the transceiver 225 may not be required or may be deactivated with regard to the LTE-RAN 122 and the WLAN 124. Thus, the UE 112 may receive all messages and data which may be relayed to the UE 110 over the short-range communication pathway. Specifically, with the UE 112 maintaining a cellular connection to the LTE-RAN 122, any emergency messages being broadcast may be received by the UE 112 and forwarded to the UE 110.

In a second manner of receiving emergency messages, the UE 110 may be separated from the companion UE 112. Specifically, the short-range communication protocol may have a range limit and the UE 110 may be at a distance greater than this range limit from the UE 112. Thus, the second manner of receiving emergency messages depends on the capability of the UE 110. Specifically, the capability of the UE 110 relates to whether the UE 110 is cellular capable (e.g., to connect to the LTE-RAN 122) and/or WiFi capable (e.g., to connect to the WLAN 124).

Since the illustrative example described herein relates to the UE 110 having a companion in the UE 112, it may be assumed that each combination herein includes a capability of a short-range communication (e.g., BlueTooth). In a first combination, the UE 110 may only be capable of short-range communications with the UE 112. Thus, if the UE 110 is separated from the UE 112, the UE 110 is incapable of connecting or monitoring the LTE-RAN 122 and further incapable of receiving emergency messages. In a second combination, the UE 110 may be capable of short-range communications with the UE 112, capable of connecting to the LTE-RAN 122, but incapable of connecting to the WLAN 124. Thus, if the UE 110 is separated from the UE 112, the UE 110 is capable of connecting and monitoring the LTE-RAN 122 and further capable of receiving emergency messages. In a third combination, the UE 110 may be capable of short-range communications with the UE 112, incapable of connecting to the LTE-RAN 122, but capable of connecting to the WLAN 124. Thus, if the UE 110 is separated from the UE 112, the UE 110 is incapable of connecting or monitoring the LTE-RAN 122 and further incapable of receiving emergency messages. In a fourth combination, the UE 110 may be capable of short-range communications with the UE 112, capable of connecting to the LTE-RAN 122, and capable of connecting to the WLAN 124. Thus, if the UE 110 is separated from the UE 112, the UE 110 is capable of connecting and monitoring the LTE-RAN 122 and further capable of receiving emergency messages.

Under the first, second, and third examples, while separated from the UE 112, there are no significant, additional power requirements when considering operations associated with receiving emergency messages. Specifically, in all three examples, the short-range communications operations may remain activated to determine whether the companion UE 112 has returned to within a range of the short-range communications protocol. In the second example, while separated from the UE 112, only the LTE-chipset may remain operational as no WiFi-chipset is available. Thus, no additional power is required to monitor for emergency messages as the UE 110 is connected to the LTE-RAN 122. In the third example, while separated from the UE 112, only the WiFi chipset may remain operational as no LTE-chipset is available. Thus, no additional power is required as the UE 110 is incapable of monitoring for emergency messages while only connected to the WLAN 124. Accordingly, there is no significant, additional usage of power associated with receiving emergency messages.

In contrast to the first three examples above, in the fourth example, while the UE 110 is separated from the UE 112, both the WiFi-chipset and the LTE-chipset may be operational since data may be being exchanged over the WLAN 124 but the emergency messages receiving capability must remain available over the LTE-RAN 122. Accordingly, although the data is being exchanged using the WLAN 124 with the WiFi-chipset being utilized, the LTE-chipset remains activated to satisfy the regulatory requirement of monitoring for emergency messages. Therefore, the exemplary embodiments provide mechanisms to alleviate this additional power requirement.

Since there are various connectivity statuses that may exist at the UE 110, the status application 235 may generate a respective status signal that is forwarded to the camping application 240. In a first example, the status application 235 may generate one of four signals where each of the four signals corresponds to the four exemplary connectivity statuses described above. In this scenario, the camping application 240 may decipher the signal and proceed accordingly. In a second example, the status application 235 may generate one of two signals where a first signal may correspond to whether the camp-only mode is to be used and a second signal may correspond to whether the camp-only mode is not to be used. In this scenario, the camping application 240 may simply receive the indication to proceed accordingly.

As noted above, the camping application 240 may be configured to generate instructions to modify the manner in which operations are performed over the LTE-RAN 122 using the camp-only mode based on the signal received from the status application 235. As will be described in detail below, when the camping application 240 has received an indication or determined that a signal corresponds to using the camp-only mode, the camping application 240 may activate the camp-only mode by providing instructions as to how operations are to be performed while monitoring the LTE-RAN 122 during a time the camp-only mode is active. As will also be described in detail below and as will become evident, the camping application 240 may perform modified operations when an emergency message is determined to be broadcast from monitoring the LTE-RAN 122 in view of how the camp-only mode alters the manner in which operations associated with the LTE-RAN 122 are performed.

According to the exemplary embodiments, the camp-only mode is used in a variety of manners to optimize the usage of a limited power supply. Again, the camp-only mode may relate to when the UE 110 is connected to the WLAN 124 for data exchange but also monitoring the LTE-RAN 122. In a first example, the camp-only mode optimizes the power consumption for receiving emergency messages (e.g., from the CMAS server 170 over the LTE-RAN 122) by only allowing the reception of emergency messages over the LTE-RAN 122. In a second example, the camp-only mode reduces signaling with the LTE-RAN 122 for periodic re-registrations. In a third example, the camp-only mode reduces standby power.

In a first manner of using the camp-only mode, there may be a signaling reduction. As noted above, only emergency messages and/or emergency message indications (e.g., pings) may be received and processed for subsequent operations to be performed. Thus, all other data received from the LTE-RAN 122 may not be processed. It is again noted that all other data may be routed and received via the WLAN 124 using the WiFi connection, particularly if the WiFi connection is also usable for voice data. The camping application 240 may therefore prevent operations and/or discard requests/other signals received over the LTE-RAN 122. For example, the UE 110 may be utilized for mobile originating (MO) and/or mobile terminating (MT) voice or video calls over the LTE-RAN 122. While the UE 110 is in the camp-only mode, the camping application 240 may prevent MO and/or MT calls. In another example, the UE 110 may have received non-emergency message pages or data. While the UE 110 is in the camp-only mode, the camping application 240 may discard and/or not respond to any page and/or data that is identified as being non-emergency message related. In a further example, the UE 110 may not perform other operations associated with MO signaling. Specifically, the UE 110 may not trigger MO signaling such as Attach, Detach, tracking area update (TAU), routing area update (RAU), location area update (LAU), etc. Thus, these modifications to the operations associated with the LTE-RAN 122 while connected to the WLAN 124 (and separated from the UE 112) may conserve the power associated with monitoring the LTE-RAN 122.

In a second manner of using the camp-only mode, there may be optimizations to an idle discontinuous reception (IDRX). Initially, it is noted that the IDRX may represent any periodic monitoring and processing of signals from the LTE-RAN 122. For example, the IDRX may represent any discontinuous reception (DRX) cycle. Specifically, the DRX cycle may define time intervals at which a radio resource control (RRC) of the transceiver 225 becomes activated to determine whether any control information is being transmitted from the LTE-RAN 122. Thus, the exemplary embodiments being described with regard to the IDRX is only exemplary and any periodic or cyclic monitoring/processing operation may be utilized.

The IDRX cycle may utilize a standard paging cycle. For example, the paging cycle may be every 1.28 seconds. However, in camp-only mode, to further increase power conservation while still maintaining the IDRX functionality, the paging cycle may be increased. For example, the paging cycle may be increased by a factor of 2 or 4 from that of the standard operation. Thus, with a standard paging cycle of 1.28 seconds, the paging cycle using the camp-only mode may be 2.56 seconds or 5.12 seconds. Accordingly, the UE 110 that is utilizing the camp-only mode may activate the transceiver 225 to determine if there is any incoming traffic from the LTE-RAN 122 at an increased paging cycle time interval. With the values noted above, the power conservation from using the camp-only mode paging cycle may be doubled or quadrupled. It is noted that the use of the standard paging cycle being 1.28 seconds as well as doubling or quadrupling the duration of the paging cycle is only exemplary. The exemplary embodiments may utilize any base paging cycle and any increase thereto (e.g., an integer value increase, any rational value increase, a random increase, etc.). It is also noted that the increase in the paging cycle may be utilized with any cellular network connection (e.g., the LTE-RAN 122, the legacy RAN 120, etc.).

The camping application 240 may be configured to dynamically determine the manner in which this modification of increasing the IDRX paging cycle is to be used. Specifically, the UE 110 may perform various measurements associated with a quality of the signals exchanged with the LTE-RAN 122 (e.g., a reference signal received power (RSRP), a received signal strength indicator (RSSI), a reference signal received quality (RSRQ), a block error rate (BLER), etc.). Based on the signal quality to the LTE-RAN 122, the camping application 240 may determine a degree to which the paging cycle is to be increased. For example, when the signal quality is below a first threshold, the camping application 240 may not utilize an increase to the standard paging cycle. In another example, when the signal quality is above the first threshold but below a second threshold (e.g., a signal strength greater than −115 dBm), the camping application 240 may utilize a first increase to the standard paging cycle (e.g., a camp-only mode paging cycle that is double the standard paging cycle). In a further example, when the signal quality is above the second threshold, the camping application 240 may utilize a second increase to the standard paging cycle (e.g., a camp-only mode paging cycle that is quadruple the standard paging cycle). In yet another example, the camp-only mode paging cycle may be used only when the signal quality satisfies a threshold and the UE 110 is determined to be stationary. As those skilled in the art will understand, if the UE 110 is moving (especially at a high rate of speed), the UE 110 may be switching between a plurality of cells and measurements at the standard paging cycle intervals provide the user with a better experience.

In a third manner of using the camp-only mode and specifically with regard to the cellular network being the LTE-RAN 122, there may be LTE measurement optimizations. As those skilled in the art will understand, in any area in which the UE 110 is located, there may be a plurality of cells or neighbor cells of the LTE-RAN 122 within proximity of the UE 110. However, all cells of the LTE-RAN 122 may be used by the CMAS server 170 to broadcast the emergency message. Therefore, the UE 110 may camp on any of the cells so long as the signal quality is at least a predetermined minimum quality. Accordingly, the camping application 240 may modify the LTE parameters to optimize the measurements of the LTE-RAN 122. Specifically, irrespective of the cell on which the UE 110 is camped (low or high priority), the same emergency message is received.

Thus, as long as the UE 110 is received a signal from the cell on which it is currently camped, the UE 110 does not need to continuously make neighbor cell measurements. In a first example, the camping application 240 may avoid priority based inter-Radio Access Technology (RAT) and inter-frequency measurements. In a second example, the camping application 240 may reduce s-NonIntraSearch measurements (e.g., inter-RAT measurements). In a third example, the camping application 240 may reduce s-IntraSearch measurements (e.g., intra-RAT measurements). In a fourth example, the camping application 240 may increase a T-detect and/or T-measure cycle based on mobility of the UE 110. By reducing or eliminating select measurements of the LTE-RAN 122, the UE 110 may increase power conservation.

In a fourth manner of using the camp-only mode and specifically with regard to the cellular network being the legacy RAN 120, there may be legacy measurement optimizations. For substantially similar reasons as the LTE-RAN 122, the UE 110 may camp on any of the cells of the legacy RAN 120 so long as the signal quality is at least a predetermined minimum quality. Accordingly, the camping application 240 may modify the legacy RAN parameters to optimize the measurements of the legacy RAN 120. In a first example, the camping application 240 may modify a priority based cell re-selection. For example, the camping application 240 may treat priority of the serving cell to be higher than configured on inter-frequency and inter-RAT layers. In this manner, the camping application 240 may avoid priority based inter-RAT and inter-frequency measurements. In another example, the camping application 240 may reduce priority searches (e.g., $S_{prioritysearch}$ and $S_{prioritysearch2}$). In a second example, for ranking based cell re-selection, the camping application 240 may reduce various search operations (e.g., $S_{intrasearch}$, $S_{intersearch}$, and $S_{searchRATm}$). By reducing or eliminating select measurements of the legacy RAN 120, the UE 110 may increase power conservation.

In view of the modifications from using the camp-only mode, the UE 110 may determine the presence of emergency messages using a modified approach to compensate for the changes due to the camp-only mode. For example, if the paging cycle is increased and the CMAS server 170 broadcasts emergency message indications in between the times that pages being sent are determined, the UE 110 may potentially miss the emergency messages. Furthermore, even if the emergency message indication is identified, under the camp-only mode, the processing and eventual display of the emergency message on the display device 215 for the user may be delayed. Accordingly, the camping application 240 may be further configured to improve the operations in determining whether an emergency message is being broadcast and receiving/processing/displaying the emergency message.

In a first manner where the cellular network is the LTE-RAN 122, the emergency messages from the CMAS server 170 are broadcast using system information blocks (SIBs). For example, the emergency message under CMAS may be broadcast in SIB 12 over the LTE-RAN 122. The CMAS server 170 may also be configured to use a page or emergency message indication (herein referred collectively as "page") to inform the UE 110 of an ongoing emergency message broadcast. Accordingly, the CMAS server 170 may instruct the page that is transmitted to the UE 110 by the LTE-RAN 122 to include the indication that SIB 12 is being used. Those skilled in the art will understand that this page from the LTE-RAN 122 may be transmitted based on the periodicity of the DRX cycle (e.g. IDRX having a standard paging cycle of 1.28 seconds). The page may also include at least the SIBs used to initiate an Attach procedure, particularly SIB 1 and SIB 2.

When the UE 110 is using the camp-only mode, since the paging cycle may be increased, the UE 110 may potentially miss one or more of the pages (that include an indication of an emergency message being broadcast) being transmitted by the LTE-RAN 122. The pages from the LTE-RAN 122 may include a "CMAS-IND". Specifically, the page may include information on system information change including SIB 1 which defines cell access related parameters and scheduling of other SIBs (particularly SIB 12 when being used for emergency messages). Thus, in the scheduling of other SIBs, an indication of SIB 12 may be included. It is noted that when the emergency message is related to the ETWS, the pages may include a "ETWS-IND".

To address the above scenario of possibly missing the pages from the LTE-RAN 122, the camping application 240 may modify the manner in which the pages are received and processed, particularly regarding a timing to perform these operations. In a first example, the camping application 240 may decode the SIB 1 each time that the transceiver wakes up to decode the page according to the increased paging cycle of the camp-only mode. Thus, when the page is decoded and the SIB 1 includes an indication for SIB 12 (e.g., CMAS-IND), then the camping application 240 may determine that an emergency message is being broadcast. In a second example, the camping application 240 may decode the SIB 1 periodically on a timer. For example, when the timer elapses (e.g., 1 minute timer), on the next paging cycle, the UE 110 may wake up to decode the page and thus, the SIB 1. Therefore, when the page is decoded and the SIB 1 includes an indication for SIB 12, then the camping application 240 may determine that an emergency message is being broadcast.

It is noted that the receiving and missing of pages may provide a further indication of how the IDRX paging cycle is to be modified. As noted above, the signal quality and the mobility of the UE 110 may provide a basis upon which the paging cycle is increased. However, even with a good signal quality, pages may still be missed. Thus, the camping application 240 may also determine the manner in which to increase the paging cycle based on missed pages. For example, if the camping application 240 receives information that a number of missed pages within a certain time duration is greater than a predetermined threshold, the camping application 240 may decrease the camp-only mode paging cycle (e.g., from 4 times to 2 times greater than the standard paging cycle). In another example, if the camping application 240 receives information that a number of missed pages is near zero or less than a predetermined threshold, the camping application 240 may consider increasing the camp-only mode paging cycle (e.g., from 2 times to 4 times greater than the standard paging cycle).

In a second manner where the cellular network is the legacy RAN 120 (e.g., WCDMA), the emergency messages from the CMAS server 170 are broadcast over a common traffic channel (CTCH). For example, the emergency message under CMAS may be broadcast in SIB 5 or SIB 5 bis may be used to configure the CTCH. In practice, select ones of the legacy RAN 120 may configure the CTCH constantly. However, select other ones of the legacy RAN 120 may configure the CTCH on demand such as when the CMAS server 170 broadcasts the emergency message. Accordingly, when the CTCH is configured when needed, the page with a broadcast control channel (BCCH) (e.g., BCCH Modification Info) may be used to inform the UE 110 that there is a change in SIBs which may further configure the CTCH using SIB 5 and/or SIB 5 bis.

In a substantially similar manner as when the cellular network is the LTE-RAN 122, when the UE 110 is using the camp-only mode and monitoring the legacy RAN 120, since the paging cycle may be increased, the UE 110 may potentially lose one or more of the pages (that include an indication of an emergency message being broadcast) when the legacy RAN 120 configures the CTCH on demand. With the increased paging cycle of the camp-only mode, the UE 110 may miss the pages, thereby being unaware of the CTCH configuration and also being unaware of the emergency message that are being broadcast. Specifically, the page may include information if the master information block (MIB) which has a substantially similar functionality as SIB 1 in the LTE-RAN 122 is modified. That is, the MIB in WCDMA defines scheduling information on SIBs. By missing the page including the information about MIB change, the scheduling of SIB 5 or SIB 5 bis and the configuration of the CTCH may be missed.

To address the above scenario of possibly missing the pages from the legacy RAN 120 and the CTCH configuration, the camping application 240 may modify the manner in which the pages are received and processed, particularly regarding a timing to perform these operations. In a first example, the camping application 240 may decode the MIB each time that the transceiver wakes up to decode the page according to the increased paging cycle of the camp-only mode. Thus, when the page is decoded and the SIB 5 or SIB 5 bis is determined to have been modified by an indication in the MIB, then the camping application 240 may determine that an emergency message is being broadcast. In a second example, the camping application 240 may decode the MIB periodically on a timer. For example, when the timer elapses (e.g., 1 minute timer), on the next paging cycle, the UE 110 may wake up to decode the page and thus, the MIB. Therefore, when the page is decoded and the MIB includes an indication for a change to SIB 5 and/or SIB 5 bis for the CTCH configuration, then the camping application 240 may determine any changes to the channels used for emergency messages being broadcast.

In a substantially similar manner to missing pages when the cellular network is the LTE-RAN 122, the camping application 240 may utilize a feature of adjusting the increase to the paging cycle based on the number of missing pages or lack thereof when the cellular network is the legacy RAN 120. Thus, with an increasing number of missed pages, the paging cycle may be decreased whereas with a decreasing number of missed pages, the paging cycle may be increased.

When the camping application 240 determines that the CMAS server 170 is broadcasting an emergency message (when the cellular network is the LTE-RAN 122 or the legacy RAN 120) by decoding a page including an indication of a corresponding SIB, the camping application 240 may prevent any delay that the camp-only mode may cause in receiving, processing, and displaying the emergency message for the user of the UE 110. Specifically, the camping application 240 may instruct that the baseband return to a normal or standard mode of operation. That is, the camp-only mode is terminated such that the baseband is returned to normal operation, the paging cycle is returned to the standard paging cycle duration, and the cellular network measurements are resumed. In this manner, the emergency message may be received using normal operations using the same amount of time to perform all required operations in receiving, processing, and displaying the emergency message.

The camping application 240 may instruct a return to the normal mode of operation for a variety of different times. In a first example, the camping application 240 may return the baseband processor 205 to normal mode for as long as the emergency message is being broadcast. When the emergency message is determined to no longer being broadcast, the camping application 240 may instruct the baseband processor 205 to utilize the camp-only mode (so long as the status application 235 indicates the proper connectivity status still exists at the UE 110). In a second example, the camping application 240 may return the baseband processor 205 to normal mode for a predetermined amount of time. For example, the predetermined amount of time may be based on an amount of time required for all the emergency messages to be received. In particular, all the emergency messages may be for unique messages (e.g., when the CMAS server 170 broadcasts a set of emergency messages and loops the messages for a number of repetitions). Thus, when the time lapses (and these messages are received even though the CMAS server 170 continues to broadcast), the camping application 240 may instruct the camp-only mode to be utilized. In another example, the predetermined amount of time may be a predetermined value. Thus, regardless of how the CMAS server 170 broadcasts the emergency messages (e.g., whether the emergency messages are continuing to be broadcast after the time lapses or whether the emergency messages stopped being broadcast prior to the time lapsing), the camping application 240 may instruct the camp-only mode to be utilized after the time lapses.

Figure 3:
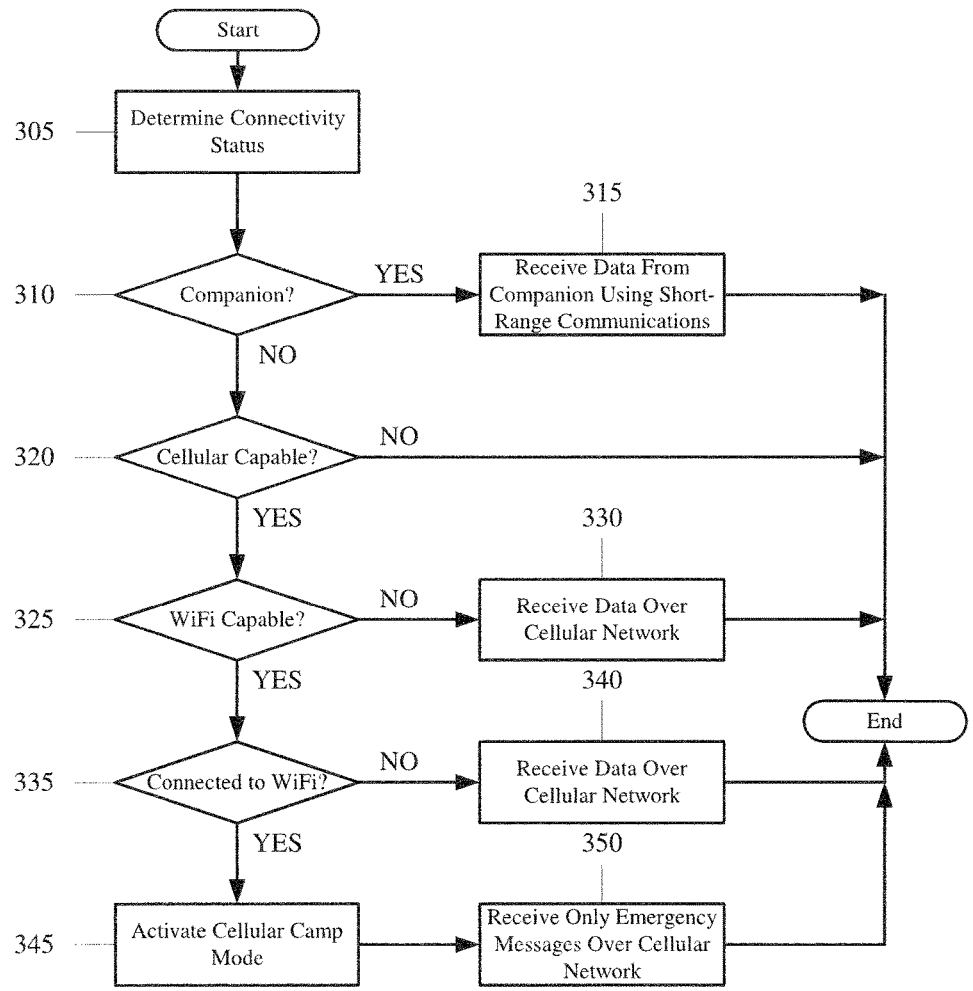
FIG. 3 shows a method for determining how to receive data over a selected network according to the various exemplary embodiments described herein.

FIG. 3 shows a method for determining how to receive data over a selected network according to the various exemplary embodiments described herein. The method 300 relates to how the UE 110 determines how data, particularly pages that indicate whether emergency messages are being broadcast, is received based on a connectivity status. The method 300 may be performed by the status application 235/or and the camping application 240. The method 300 will be described with regard to the network arrangement 100 of FIG. 1 and the UE 110 of FIG. 2.

In 305, the UE 110 determines a connectivity status. As described above, the status application 235 may receive information from the one or more networks and/or the one or more UEs to which a connection may be established by the UE 110. For example, when the UE 110 has a companion UE (e.g., UE 112) or otherwise receives data from another UE, a determination may be made that a short-range communication pathway has been established. In another example, when the UE 110 is cellular capable, the UE 110 may establish a cellular connection to the legacy RAN 120 or the LTE-RAN 122. In a further example, when the UE 110 is WiFi capable, the UE 110 may establish a WiFi connection to the WLAN 124. Thus, the connectivity status of the UE 110 may be any one of the six combinations from these three connection types.

In 310, the UE 110 determines whether a companion UE is within range of the short-range communication protocol. Assuming the UE 110 is a slave to a master companion or otherwise configured to receive data from the other UE and the UE 110 has established the short-range communication pathway with the other UE, in 315, the UE 110 receives data from the companion over the short-range communication pathway (e.g., BlueTooth). That is, the UE 110 may deactivate the portions of the transceiver 225 and the processor 205 that may be allocated for cellular network connections and WiFi connections.

If the UE 110 has no companion UE or is outside the range of the short-range communication protocol, in 320, the UE 110 determines whether the UE 110 is cellular capable. As described above, the UE 110 may be configured with the short-range communication capability and only one of a WiFi capability or a cellular capability. When the UE 110 is not cellular capable, the UE 110 is only capable of receiving emergency messages from the companion UE. Thus, when separated from the companion UE, even if WiFi capable, the UE 110 still cannot receive emergency messages as the cellular network is used to broadcast the emergency messages.

If the UE 110 has no companion UE or is outside the range of the short-range communication protocol and is cellular capable, in 325, the UE 110 determines whether the UE 110 is WiFi capable. Again, the UE 110 may be configured with the short-range communication capability and only one of a WiFi capability or a cellular capability. When the UE 110 is cellular capable but not WiFi capable, in 330, the UE 110 may establish a cellular connection to receive data including any emergency messages from the cellular network.

If the UE 110 has no companion UE or is outside the range of the short-range communication protocol and is also cellular and WiFi capable, in 335, the UE 110 determines whether the UE 110 is connected to the WLAN 124 using a WiFi connection. If the UE 110 is not connected to the WLAN 124 and the cellular connection is capable of being established, in 340, the UE 110 may establish the cellular connection to receive data including any emergency messages from the cellular network.

If the UE 110 has no companion UE or is outside the range of the short-range communication protocol and is also cellular and WiFi capable with an established WiFi connection to the WLAN 124, the above noted issue of additional power requirements may exist. Thus, in 345, the UE 110 activates the camp-only mode for the cellular network. That is, all data that is configured to be processed over the WLAN 124 may be received using the WiFi connection. However, as emergency messages are only received over the cellular connection, the camp-only mode provides a modified usage of the cellular connection to retain the capability of receiving emergency messages by monitoring the cellular network. Specifically, the camp-only mode may include reduced or eliminated signaling (e.g., MO or MT signals), an increased paging cycle, and reduced or eliminated network measurements. Accordingly, in 350, the UE 110 receives or processes only pages directed to emergency messages over the cellular network under the camp-only mode.

It is noted that the method 300 may be an iterative process so long as the UE 110 is being used or activated. For example, while the UE 110 is activated, after 315, 330, 340, or 350, the method 300 may return to 305 to optimize the manner in which data (particularly emergency messages) is being received (e.g., through the short-range communication pathway, through a cellular connection, or using a camp-only mode for the cellular connection).

Figure 4:
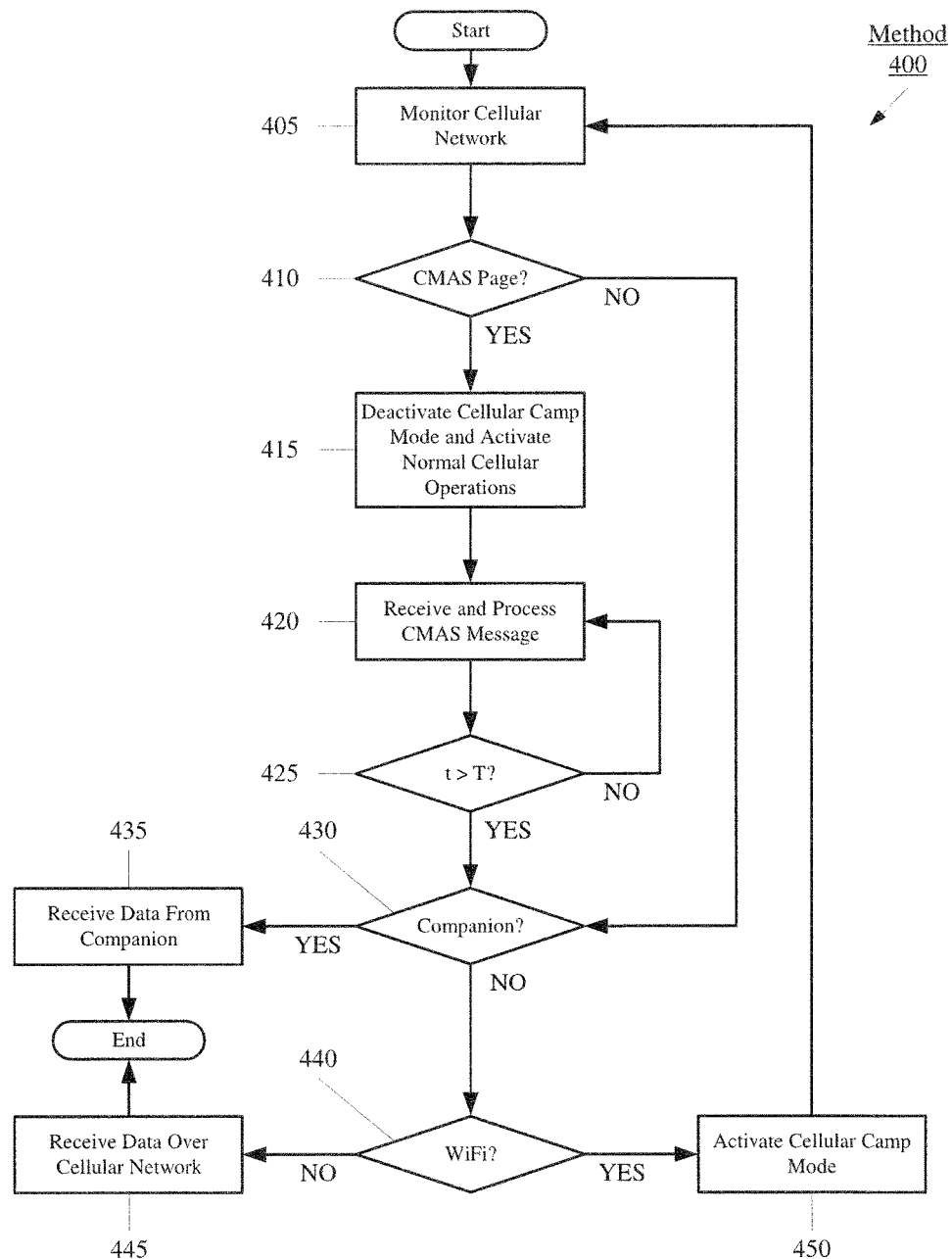
FIG. 4 shows a method for receiving emergency messages using a camp-only mode according to the various exemplary embodiments described herein.

FIG. 4 shows a method for receiving emergency messages using a camp-only mode according to the various exemplary embodiments described herein. The method 400 relates to how the UE 110 that is using a camp-only mode receives pages and receives/processes/displays emergency messages. That is, the UE 110 may be connected to the WLAN 124 and monitoring one of the cellular networks (e.g., the LTE-RAN 122 or the legacy RAN 120) (as well as separated from the companion UE). Accordingly, the features described above while the UE 110 is in the camp-only mode may be in effect. The UE 110 may also be monitoring the cellular network. The method 300 may be performed by the status application 235 and the camping application 240. The method 300 will be described with regard to the network arrangement 100 of FIG. 1 and the UE 110 of FIG. 2.

In 405, the UE 110 monitors the cellular network, such as the LTE-RAN 122 or the legacy RAN 120. Specifically, the UE 110 monitors the cellular network using the features of the camp-only mode. Thus, pages from the cellular network may be decoded at predetermined times (e.g., each time the UE 110 wakes up to decode the cellular page based on the increased camp-only mode paging cycle or at predetermined times). In 410, the UE 110 determines whether the page included an indication that an emergency message is being broadcast by the CMAS server 170. For example, when the cellular network is the LTE-RAN 122, the page may include an indication that the system information has been changed which includes a SIB 1 that has an indication regarding SIB 12 which is used to configure receiving the emergency message being broadcast. In another example, when the cellular network is the legacy RAN 124, the page may include information about change in system information including the MIB that has an indication regarding SIB 5 and/or SIB 5 bis about a CTCH configuration.

If the page does not indicate an emergency message, the UE 110 continues to 430 which will be described below. However, if the page indicates an emergency message, in 415, the UE 110 deactivates the camp-only mode and activates the normal mode of operations (e.g., establishing a cellular connection, normal signal processing, standard paging cycle, normal network measurements, etc.). In 420, the UE 110 receives and processes the emergency message using the normal mode of operations for the cellular connection. Once processed, the emergency message may be displayed on the display device 215 for the user of the UE 110 to view and read.

In 425, the UE 110 determines whether the amount of time from when the UE 110 entered the normal mode of operation has passed a predetermined amount of time. As described above, this predetermined amount of time may be so long as the emergency message from the CMAS server 170 is being broadcast, a time dynamically selected to ensure that all emergency messages from the CMAS server 170 may be received, or a predetermined time duration. If the predetermined amount of time has not lapsed, the UE 110 continues to receive and process the emergency message in 420. However, if the predetermined amount of time has lapsed, the UE 110 continues to 430.

In 430, while the UE 110 is either still in the camp-only mode (from 410) or in the normal mode of operations for the cellular connection, the UE 110 determines the manner in which to receive data and more particularly to receive and process emergency messages. Thus, the UE 110 determines whether the companion UE (e.g., UE 112) has returned to within the range of the short-range communications protocol. If the companion UE has returned, in 435, the UE 110 utilizes the short-range communication pathway to receive data relayed from the companion UE.

If the companion UE remains separated from the UE 110 and outside the range of the short-range communications protocol, in 440, the UE 110 determines whether the UE 110 is still connected to the WLAN 124 with a WiFi connection. If no longer connected to the WLAN 124, in 445, the UE 110 utilizes the cellular connection and receives data from the cellular network.

If the companion UE remains separated from the UE 110 and outside the range of the short-range communications protocol and the UE 110 is still connected to the WLAN 124 with a WiFi connection, in 450, the UE 110 activates (or maintains) the camp-only mode to monitor the cellular network. That is, the power conservation operations may be utilized as defined by the camp-only mode. Since the camp-only mode has resumed, the UE 110 may return to 405.

It is noted that the method 400 may be modified to incorporate further features described above. For example, the paging cycle may not have been increased due to various reasons (e.g., poor signal quality to the cellular network, high mobility of the UE 110, high missed pages from the cellular network, etc.). When the paging cycle has not been increased, the pages may continue to be received as if the camp-only mode was not used (although the other features of the camp-only mode may be used). In this scenario, the UE 110 may not be required to perform 415 as the page decoding operations remain the same as the normal mode of operation for the cellular connection.

The exemplary embodiments are described above with a specific scenario where the UE 110 is a slave device and separated from the master companion UE 112, the UE 110 is WiFi capable and connected to the WLAN 124, and the UE 110 is cellular capable and monitoring the LTE-RAN 122 or the legacy RAN 120. However, this scenario is only exemplary in determining whether to utilize the camp-only mode. Those skilled in the art will also understand that there may be other scenarios in which the camp-only mode may be utilized to retain a capability of monitoring for emergency messages being broadcast over cellular networks. For example, the UE 110 may be under an international roaming condition in which the UE 110 has exited its home region into a foreign region. However, the foreign region may also require that cellular capable UEs retain the capability of receiving emergency messages. Thus, without incurring roaming charges and by reducing the power requirements, the UE 110 may utilize the camp-only mode when the international roaming condition is identified.

The exemplary embodiments provide a device, system, and method of utilizing a camp-only mode of operation on a UE that is separated from a companion UE, connected to a WiFi network, and configured to connect to a cellular network. Thus, although data is being exchanged through the WiFi network, the cellular network is monitored to retain the capability of receiving emergency messages that are only broadcast over the cellular network. However, to minimize the additional drain on power of a limited power supply due to otherwise maintaining a cellular connection, the camp-only mode provides various modifications that reduce or eliminate a plurality of operations. The reduction/elimination of these operations may result in potential losses of pages to receive an emergency message broadcast. Thus, the exemplary embodiments also provide a mechanism to compensate for these potential losses.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

It will be apparent to those skilled in the art that various modifications may be made in the present invention, without departing from the spirit or the scope of the invention. Thus, it is intended that the present invention cover modifications and variations of this invention provided they come within the scope of the appended claims and their equivalent.

What is claimed is:

1. A method, comprising:
at a device that is configured to establish a first connection to a wireless local area network (WLAN) and configured to establish a second connection to a cellular network:
determining a connectivity status of the device; and
when the connectivity status indicates that the device has established the first connection to the WLAN, utilizing a camp-only mode to monitor the cellular network the camp-only mode reducing a frequency of performing at least one type of operation associated with the cellular network based on the indication that the first connection to the WLAN has been established, the camp-only mode configured to retain a capability of determining whether an emergency message is being broadcast over the cellular network, wherein the at least one type of operation comprises an increase to a paging cycle, the paging cycle defining a time interval in which a page from the cellular network is received.

2. The method of claim 1, wherein the cellular network is one of a Long Term Evolution (LTE) network and a Wideband Code Division Multiple Access (WCDMA) network.

3. The method of claim 1, wherein the at least one type of operation includes at least one of eliminating an origination of mobile originating (MO) and mobile terminating (MT) calls, discarding an indication for a non-emergency message, and eliminating MO signaling, wherein the MO signaling includes at least one of an Attach, a Detach, a tracking area update (TAU), routing area update (RAU), and location area update (LAU).

4. The method of claim 1, wherein the time interval of the paging cycle is 1.28 seconds, wherein the increase to the paging cycle is one of by a factor of 2 or 4.

5. The method of claim 1, wherein the paging cycle is increased when the second connection has a connection quality greater than a predetermined threshold and when the device is also stationary.

6. The method of claim 1, wherein the at least one type of operation includes a reduction in network measurements associated with the cellular network and an increase in network detection cycles with the cellular network and an increase in network measurement cycles with the cellular network.

7. The method of claim 6, wherein the network measurements for a first type of the cellular network includes at least one of priority based radio access technology (RAT) measurements, priority based inter-frequency measurements, s-NonIntraSearch measurements, and s-IntraSearch measurements, wherein the network measurements for a second type of the cellular network includes at least one of priority based cell reselection measurements and ranking based cell reselection measurements.

8. The method of claim 1, wherein the device is a slave device associated with a master companion device, the slave device and the master companion device configured to establish a short-range communication connection.

9. The method of claim 8, wherein the camp-only mode is utilized when the master companion device has disconnected from the slave device over the short-range communication connection.

10. The method of claim 1, further comprising:
determining that the emergency message is being broadcast over the cellular network;
utilizing a normal mode where the second connection is established with the cellular network, the normal mode returning the frequency of the at least one type of operation associated with the cellular network prior to utilizing the camp-only mode; and
receiving, processing, and displaying the emergency message.

11. The method of claim 10, wherein the emergency message being determined to be broadcast over the cellular network is based on decoding a page transmitted from the cellular network while utilizing the camp-only mode, the page including an indication.

12. The method of claim 11, wherein the page includes an indication of system information change for one of a system information block (SIB) 1 or a master information block (MIB) that includes the indication.

13. The method of claim 11, wherein the page is decoded while utilizing the camp-only mode one of each time a transceiver wakes up based on a periodicity or at a predetermined time period.

14. The method of claim 10, further comprising:
determining a further connectivity status of the device; and
when the device has established the first connection and a predetermined time duration has lapsed, utilizing the camp-only mode to monitor the cellular network.

15. The method of claim 1, wherein the emergency message is based a Commercial Mobile Alert System (CMAS) or Earthquake and Tsunami Warning Service (ETWS).

16. A device, comprising:
a transceiver configured to establish a first connection to a wireless local area network (WLAN) and configured to establish a second connection to a cellular network; and
a processor determining a connectivity status of the device, when the connectivity status indicates that the device has established the first connection to the WLAN, the processor utilizing a camp-only mode to monitor the cellular network, the camp-only mode reducing a frequency of performing at least one type of operation associated with the cellular network based on the indication that the first connection to the WLAN has been established, the camp-only mode configured to retain a capability of determining whether an emergency message is being broadcast over the cellular network, wherein the at least one type of operation comprises an increase to a paging cycle, the paging cycle defining a time interval in which a page from the cellular network is received.

17. The device of claim 16, wherein the cellular network is one of a Long Term Evolution (LTE) network and a Wideband Code Division Multiple Access (WCDMA) network.

18. The device of claim 16, wherein the device is a slave device associated with a master companion device, the slave device and the master companion device configured to establish a short-range communication connection.

19. An integrated circuit, comprising:
circuitry to determine a connectivity status of a device configured to establish a first connection to a wireless local area network (WLAN) and configured to establish a second connection to cellular network; and
when the connectivity status indicates that the device has established the first connection to the WLAN, circuitry to utilize a camp-only mode to monitor the cellular network, the camp-only mode reducing a frequency of performing at least one type of operation associated with the cellular network based on the indication that the first connection to the WLAN has been established, the camp-only mode configured to retain a capability of determining whether an emergency message is being broadcast over the cellular network, wherein the at least one type of operation comprises an increase to a paging cycle, the paging cycle defining a time interval in which a page from the cellular network is received.

* * * * *